Patented Mar. 31, 1936

2,035,642

UNITED STATES PATENT OFFICE 2,035,642

HORMONE AND PROCESS OF OBTAINING THE SAME

Edward A. Doisy, Webster Groves, Mo., and Philip A. Katzman, Bangor, Mich., assignors to President and Board of Trustees of St. Louis University, St. Louis, Mo.

No Drawing. Application May 31, 1932,
Serial No. 614,614

4 Claims. (Cl. 167—74)

The invention relates to a process for obtaining in concentrated form and high state of purity the anterior pituitary-like hormone.

It is known that the urine of pregnancy and especially human urine contains not only high concentrations of the ovarian hormones but also a considerable amount of an active substance which has been designated as the anterior pituitary-like sex hormone.

It is also known that when urine of pregnancy is concentrated and treated with several volumes of alcohol or acetone a salt precipitate is obtained which contains some of the anterior pituitary-like hormone, the ovarian hormones remaining in solution. It is further known that the anterior pituitary-like hormone may be obtained from urine by salting-out methods, but likewise in relatively crude form.

The primary object of this invention is to obtain the anterior pituitary-like hormone from the urine of pregnancy by a practical method and yet in a high state of purity. A further object is to obtain a relatively stable preparation of low toxicity.

Another object of the invention is to devise a process capable of concentrating the activity of anterior pituitary products which have been initially prepared by various other processes, thereby obtaining a final product which is substantially the pure hormone itself.

Another important object of the invention is to make available as a therapeutic agent a product containing the anterior pituitary-like hormone in high state of purity and having physiological activity as great as 5,000 mouse units per milligram of solid material.

Our process is based on the discovery that the anterior pituitary-like hormone may be adsorbed and desorbed by certain reagents without appreciable loss of activity.

The reagents which we find available for this adsorption process may be described generally as materials which are insoluble in water but soluble in other solvents. The preferred reagent is benzoic acid dissolved in acetone and although our process is not limited to these specific materials, we will first describe one practical process utilizing the same.

The anterior pituitary-like hormone may be characterized best by its physiological properties and since the methods of assay used by various workers may differ considerably, the specific method used by us is here described and the unit of potency defined. In the assay of our preparations we have taken as the mouse unit (M. U.) the minimum quantity of material which when administered subcutaneously to 19-day-old mice in six equal portions during the course of three days produces opening of the vagina and estrus on the twenty-second to twenty-fourth day of age. In control animals opening of the vagina occurs on the average on the thirtieth day and estrus on the forty-eighth day of age.

The presence of ovarion hormones will interfere with this method of assay but since they are readily soluble in acetone our preferred method of preparation of the anterior pituitary-like hormone precludes their presence.

The anterior pituitary-like hormone differs in physiological reaction from the ovarian hormone in that it produces no effect when administered to ovariectomized animals, whereas the ovarian hormone initiates a typical estral cycle in such animals.

Our preferred method for preparing the anterior pituitary-like hormone is as follows:

A mixed one liter sample of urine is acidified to a pH of 4 to 5 by the addition of acetic acid and clarified by centrifugation if necessary. There is added next, with stirring, 50 cc. of acetone saturated with benzoic acid. The urine is usually allowed to stand during an hour or it may be set in the refrigerator over night. The precipitated benzoic acid is collected by filtration on a suction filter and dissolved in 50 cc. of acetone. The small amount of flocculent, acetone-insoluble material contains the active substance. It settles quickly and is obtained by decanting the supernatant liquid and centrifuging the remainder. The precipitate is washed well with acetone to remove benzoic acid and traces of ovarian hormones and extracted three times with 40, 30, and 30 cc. portions of distilled water respectively, the insoluble matter being separated each time by centrifuging. The aqueous solution (100 cc.) which is colored slightly yellow usually contains 70% of the activity present in the original urine, but additional quantities of the hormone are recovered by repeating the benzoic acid adsorption upon the urine filtrate obtained from the first precipitation. For this purpose the acetone solution of benzoic acid recovered from the first precipitation is resaturated with benzoic acid and added to the urine filtrate.

Even the crude anterior pituitary-like hormone solution obtained above is relatively potent since assay shows approximately 100 M. U. per milligram of solids. It represents a potency practically equal to the best preparations heretofore obtained by other methods. We know, however, that it is not more than two (2) percent pure since by methods hereinafter described we have succeeded in obtaining it in a potency of 5,000 M. U. per milligram.

The crude material (100 M. U. per milligram) is purified to a 1000 M. U. per milligram product simply by a single repetition of the above procedure. The aqueous solution obtained above (100 cc.) is treated with 10 cc. of the saturated acetone-benzoic acid with a recovery of 50 to 80% of the activity in the precipitate. These results obtained in the laboratory are illustrated in Table I.

TABLE I

Purification of extract by benzoic acid adsorption

| Preparation No. | Adsorption with benzoic acid | | Percent recovery | Total solids | | Mouse units per Mg. | |
|---|---|---|---|---|---|---|---|
| | M.U. used | M.U. recovered | | Mg. used | Mg. recovered | Before adsorption | After adsorption |
| 41C | 31000 | 25000 | 80 | 380 | 19 | 83 | 1250 |
| 58C | 60000 | 30000 | 50 | 484 | 26.5 | 125 | 1250 |
| 57C₁ | 10000 | 7000 | 70 | 286 | 16 | 40 | 440 |
| 68C | 80000 | 60000 | 75 | 1135 | 100 | 65 | 585 |

Further purification of the 1000 M. U. product is attained by fractional precipitation with acetone from a fairly concentrated solution. The active material is precipitated when the acetone concentration is increased to 50–60%. Above or below these limits the precipitated material is relatively inactive and hence a purification is attained, as is shown in Table II in which the results of three typical laboratory experiments are illustrated. The product obtained assays fully 3000 M. U. per milligram.

TABLE II

Purification by fractional precipitation with acetone

| Preparation No. | Mouse units per Mg. | | Mgs. per mouse unit |
|---|---|---|---|
| | Before | After | |
| 41 | 1250 | 3800 | 0.00026 |
| 58 | 1250 | 3000 | 0.00033 |
| 68 | 580 | 3400 | 0.0003 |

Further purification of the anterior pituitary-like hormone may be obtained by subjecting the product to isoelectric precipitation, but since it is a water soluble preparation, fractionation must be conducted in the presence of an organic liquid and for this purpose we prefer acetone.

As an example of this process 5 cc. of a water solution containing 17,000 M. U. was mixed with 5 cc. of acetone containing approximately 0.13 N ammonia. A small quantity of brucine was dissolved in this mixture and then acetone containing approximately 0.2 N acetic acid added in 1 cc. portions. The precipitates formed upon the addition of each portion of acetone acetic acid were tested for their physiological activity. The first precipitate was inactive, the second contained 8000 and the third 8000 M. U. The solid material left in solution was for practical purposes inactive. The assay of the second and third precipitates gave 5,000 M. U. per milligram. This final product is a water soluble powder which still yields the biuret reaction and is, we believe, substantially the pure hormone itself.

While we have outlined above in detail a preferred procedure by which we have obtained the anterior pituitary-like hormone assaying 5,000 M. U., our invention is not limited to the specific reagents listed nor to the exact sequence of steps as considerable modification may be resorted to while obtaining the beneficial results of our invention.

In the broader aspects of our invention, we have discovered a process which may be used for increasing the potency of various products containing the anterior pituitary-like hormone. One of the important features of the invention resides in the step of separating the hormone from associated impurities by adsorption and desorption. As previously stated, the reagents adapted for our process may be described generally as water-insoluble substances obtainable as a finely divided precipitate in the hormone-containing solution. Preferably the reagent is dissolved in an organic liquid miscible with water or urine such as the various alcohols, ketones, etc., but it may also be introduced into the hormone solution in the form of a soluble compound which may be converted into the insoluble precipitates by subsequent treatment. For example, sodium benzoate may be added to a water solution containing the anterior pituitary-like hormone and a benzoic acid precipitate obtained by subsequent acidifying of the solution. This precipitate will contain the adsorbed anterior pituitary-like hormone.

It is further to be understood that the adsorption may be carried out with materials other than benzoic acid, it being important only that the material be such that the anterior pituitary-like hormone may be readily separated therefrom without appreciable loss of activity. Other materials which may be used are cinnamic acid, naphthoic acid, adipic acid and stearic acid.

The specific process heretofore described was illustrated with a one-liter quantity of urine as a starting material but the process may be carried out practically on a much larger scale, for example, in 100 liter lots. It is also to be noted that the original acidification of the urine can be carried out with any acid although we prefer a relatively weak acid such as acetic. While we have used acetone as the preferred desorbing reagent, other reagents may be used in lieu thereof providing they are solvents for the adsorbent and neither dissolve nor injure the anterior pituitary-like hormone. Examples of other reagents are ether and the various alcohols but we prefer acetone as it has proved best in practice. One of the advantages of acetone is that it is a solvent for the ovarian harmones and therefore effectually separates these hormones from the anterior pituitary-like hormone.

The re-dissolving of the residue remaining after the benzoic acid precipitate has been taken up by acetone may be accomplished with smaller amounts of water than indicated. When 100 liter lots are used, the total volume of the aqueous solution is only about 300 cc.

In the final purification by isoelectric precipitation the use of brucine is not absolutely essential. Even when brucine is omitted entirely the process is useful for purification purposes. Further, it is possible to use in place of brucine other buffer salts.

It is therefore to be understood that the process outlined above is shown by way of example only and the breadth of the invention is to be determined only by the prior art and the claims appended hereto.

What we claim as our invention:

1. The process of concentrating the anterior pituitary-like hormone from solutions containing the same comprising the addition of a solution of benzoic acid to said hormone solution thereby forming a precipitate of benzoic acid containing the anterior pituitary-like hormone adsorbed therewith, separating the precipitate containing the adsorbed hormone from the solution, dissolving the adsorbent leaving an insoluble residue containing the hormone and finally extracting the hormone from said residue with a solvent therefor.

2. The process of concentrating the anterior pituitary-like sex hormone from solutions containing the same consisting in adsorbing said hormone by producing a precipitate in said solution of an organic acid insoluble in the solution but soluble in acetone and capable of adsorbing the hormone from the solution, separating organic acid and adsorbed hormone from the solution, extracting the organic acid with acetone in which the hormone is insoluble, dissolving the remaining desorbed hormone in aqueous acetone, containing less than about 50% acetone, separating the solution from any insoluble impurities and precipitating said hormone in purified form from the solution by addition of more acetone to bring the concentration to about 50 to 60% acetone, and finally separating the hormone from the solvent.

3. The process of concentrating the anterior pituitary-like sex hormone from aqueous solutions containing the same comprising adsorbing said hormone by producing a precipitate in said solution of benzoic acid, separating said benzoic acid and adsorbed hormone from the solution, extracting the benzoic acid with acetone in which the hormone is insoluble, dissolving the remaining desorbed hormone in aqueous acetone containing less than about 50% acetone, separating the solution from any insoluble impurities and precipitating said hormone in purified form from the solution by addition of more acetone to bring the concentration to about 50 to 60% acetone and finally separating the hormone from the solvent.

4. The process of obtaining the substantially pure anterior pituitary-like sex hormone from urine comprising acidifying urine to a pH value of 4 to 5, adding a solution of acetone saturated with benzoic acid forming a precipitate of benzoic acid with adsorbed anterior pituitary-like hormone, separating said precipitate from the urine filtrate, treating said precipitate with acetone thereby dissolving benzoic acid and leaving said hormone in the precipitate and dissolving said precipitate thereby obtaining a solution of the anterior pituitary-like hormone.

EDWARD A. DOISY.
PHILIP A. KATZMAN.